United States Patent

Cannella

[15] 3,646,734
[45] Mar. 7, 1972

[54] EMERGENCY FILTER FOR FLUID BRAKING SYSTEMS

[72] Inventor: Joseph L. Cannella, Melrose Park, Ill.
[73] Assignee: The Berg Manufacturing Company, Des Plaines, Ill.
[22] Filed: Apr. 9, 1970
[21] Appl. No.: 27,087

[52] U.S. Cl. .................................55/313, 55/314, 210/90
[51] Int. Cl. .......................................................B01d 46/42
[58] Field of Search ...........................55/309, 312-314; 210/90

[56] References Cited

UNITED STATES PATENTS

| | | |
|---|---|---|
| 1,805,658 | 5/1931 | Farmer ...........................55/309 X |
| 1,935,813 | 11/1933 | Neveu ............................55/309 |
| 2,016,541 | 10/1935 | Campbell ........................55/313 |

Primary Examiner—S. Leon Bashore
Assistant Examiner—Robert L. Lindsay, Jr.
Attorney—Parker, Carter & Markey

[57] ABSTRACT

An emergency filter means for use with an airbrake system relay valve or the like. A filter of a cylindrical shape is located in a filter chamber communicating with the emergency line inlet and a valve chamber so that fluid enters the inlet, passes through the filter to the relay valve chamber. In the event the filter becomes blocked by foreign matter, the force of the flow of fluid will unseat the filter by compressing a spring holding it in place, thereby permitting the fluid to bypass the blocked filter.

1 Claim, 3 Drawing Figures

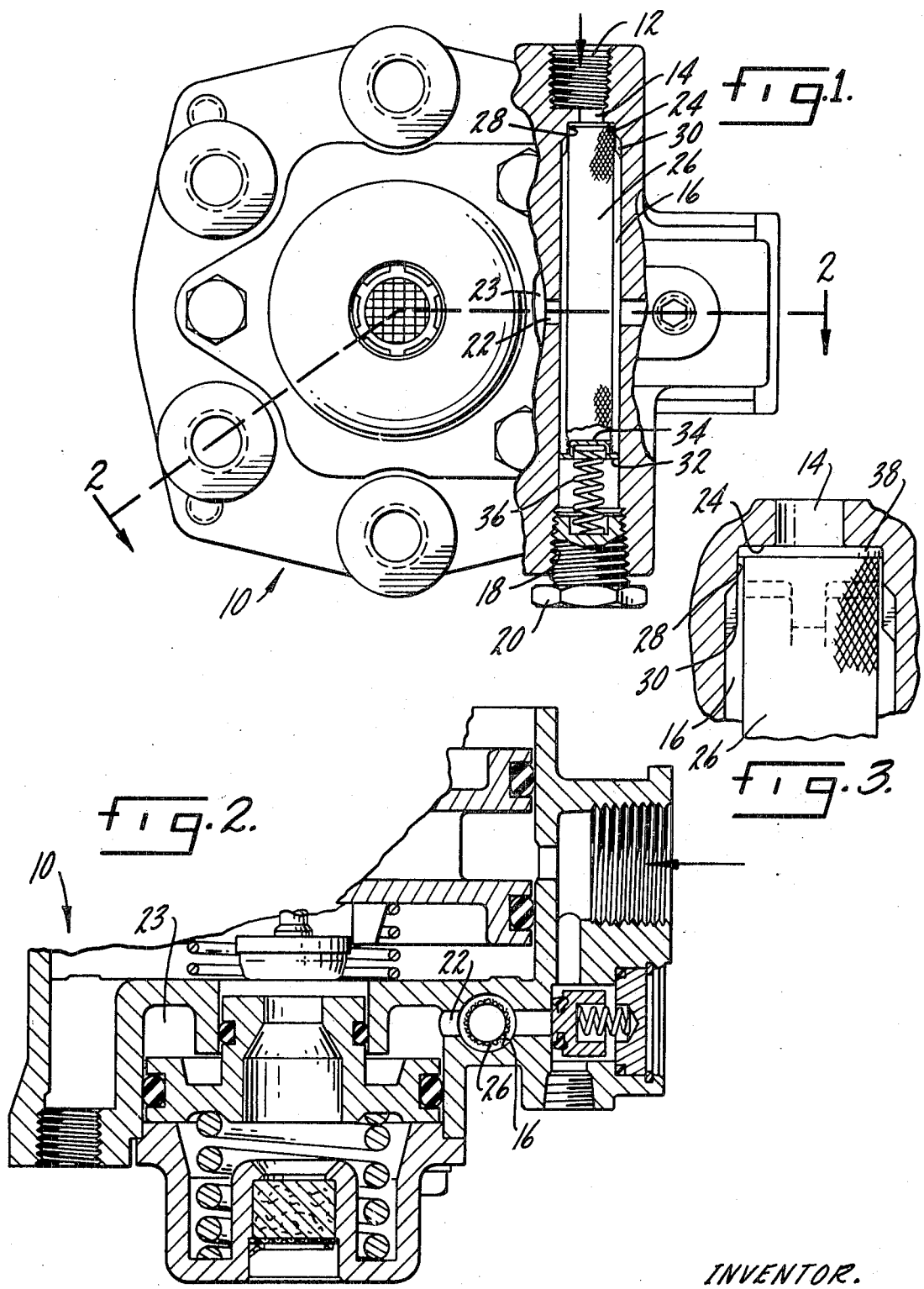

3,646,734

EMERGENCY FILTER FOR FLUID BRAKING SYSTEMS

SUMMARY OF THE INVENTION

The relay valve used in air-braking systems common to trucks, busses and other vehicles is an important element in the system. Proper functioning by this relay valve is essential for maintaining a working braking system. The relay valve typically has a considerable number of moving parts which may stick or otherwise operate erratically in the event unwanted dirt or residue is present within the fluid lines of the system. Filters were introduced at various inlets to the relay valve in an attempt to prevent foreign matter from entering the valve in an effort to maintain the integrity of the system and to prolong the time between periodic cleanings. As the filter accumulates dirt and grime, residue builds up so that flow through the filter is effectively blocked after a time. Obviously, the blocking of the fluid flow may cause failure of the braking system, which of course could be disasterous.

Accordingly, an object of the invention is to provide a filter that will effectively filter the fluid flowing into the relay valve, and in the event that it becomes blocked, permit the fluid flow to bypass the filter and enter the chamber, thereby maintaining the integrity of the braking system until it is cleaned.

Another object is a filter that may be inserted into the filter chamber that communicates with the emergency fluid line and a valve chamber.

Another object is a filter that is of a cylindrical shape and which may be easily removed from the filter chamber for cleaning or replacement.

Another object is a passage that will receive the filter and is adapted to permit only axial movement of the filter.

Another object of the invention is a filter having an end plate with a recession at its center portion for receiving the end portion of a spring and an annular seal at the opposite end for engaging an annular seat in the filter chamber communicating with the air inlet.

Other objects will become apparent from the ensuing specification, drawings and claims.

DESCRIPTION OF THE DRAWINGS

FIG. 1 is a bottom view, partially in section, of a relay valve.
FIG. 2 is a view taken along section 2—2 of FIG. 1.
FIG. 3 is a sectional view of a portion of the passage in the relay valve on an enlarged scale.

DESCRIPTION OF THE PREFERRED EMBODIMENT

Referring to the drawings, the relay valve, indicated generally at 10, has an emergency line inlet 12 communicating with a passage 14 which in turn communicates with filter chamber 16. The chamber 16 has an opening 18, through which access to the chamber 16 may be gained by the removal of the threaded plug 20. A second passage 22 communicates the chamber 16 with a valve chamber 23. A seat 24 is located at the end portion of the chamber 16 for seating the end of the filter 26. Although the outside diameter of the cylindrically shaped filter 26 is less than the inside diameter of the chamber 16, radial movement by the filter 26 within the chamber 16 is restricted by reducing the inside diameter of chamber 16 near the passage 14, as at 28. A number of circumferentially spaced ribs 30 may extend parallel to the axis of the chamber 16 to provide additional support of the filter 26. Although the number of ribs 30 is shown to be four, it is understood that three or more may be successfully utilized.

At the opposite end of the filter 26 is an end plate 32 having a recessed portion 34 which is adapted to be inserted into the end portion of the filter 26 as well as to receive the end portion of a spring 36. The end of the filter 26 adjacent the seat 24 may have an annular seal 38.

The filter 26 may be of any suitable filtering material having sufficient strength to maintain its cylindrical shape when subjected to the compressive force supplied by the spring 36. The filter may be constructed of a fine mesh stainless steel or other suitable material.

The use, operation and function of the invention are as follows:

During the normal operation of the relay valve 10, fluid will intermittently flow into the inlet 12, through the passage 14, to the filter 26 which is biased by the spring 36 to engage the seat 24. The flow continues through the filter, through the passage 22 to valve chamber 23.

In the event that the flow of fluid contains foreign matter, it will adhere to the filtering surface which of course will tend to effectively reduce the amount of fluid passing therethrough. The flow may become blocked, prohibiting the fluid from reaching the chamber 23, an event that may easily prove detrimental to the proper functioning of the relay valve. If such blockage of the filter occurs, the force of the flow will push the filter 26 in the direction of the flow, thereby compressing the spring 36, unseating the seal 38 from the seat 24, thereby enabling the flow to bypass the filter and pass to the valve chamber 23.

It is understood that the spring 36 may be chosen so that it urges the seal 38 in sealing engagement with the seat 24 under normal operation.

It is understood that various other changes in the details and arrangement of parts, which have been described and illustrated to explain the nature of the invention, may be made by those skilled in the art and such changes should not detract from the spirit and scope of the invention.

I claim:

1. In a relay valve for use in fluid pressure braking systems, a housing, an emergency inlet, a valve chamber, an elongated, cylindrical filter chamber disposed tangentially of an extending in opposite directions beyond said valve chamber, a first passage communicating said inlet with one end of said filter chamber, a second passage intermediate the ends of said filter chamber and communicating said filter chamber with said valve chamber, a hollow, elongated, tubular filter means movably mounted within said filter chamber, yielding means in the opposite end of said filter chamber and urging said filter into a first position to filter fluid flowing from said first to said second passages, said filter being movable into a second position to bypass said filter in response to pressure created within said filter greater than the force of said yielding means, said filter overlying and extending in opposite directions beyond said second passage at all positions of said filter, said filter having an outer diameter less than the diameter of said filter chamber, an annular sealing means associated with a first open end portion of said filter, said sealing means being adapted to engage an annular seat integrally formed in said housing about said first passage whereby fluid from said inlet enters said filter through said first open end portion, said yielding means biasing said filter and urging said sealing means into sealing engagement with said seat whereby said fluid is filtered by flowing from said first passage through said opening at said first filter end portion to the interior of said filter, passing through the cylindrical wall of said filter to said filter chamber and thence through said second passage to said valve chamber, an end plate having a recessed center portion integrally formed therein, said end plate being secured to and enclosing the opposite end portion of said filter, said recessed center plate portion being adapted to receive an end of said yielding means, said end plate having a diameter substantially equal to the inner diameter of said filter chamber whereby said end plate serves to center and guide said filter in said filter chamber, said filter chamber including at least three substantially equally circumferentially spaced axially paralleled ribs positioned adjacent said first passage and adapted to receive and guide said first end portion of said filter and said sealing means in longitudinally movable engagement.

\* \* \* \* \*